United States Patent
Zhao et al.

(10) Patent No.: US 10,082,795 B2
(45) Date of Patent: *Sep. 25, 2018

(54) VISION-BASED ON-BOARD REAL-TIME ESTIMATION OF WATER FILM THICKNESS

(71) Applicant: GM GLOBAL TECHNOLOGY OPERATIONS LLC, Detroit, MI (US)

(72) Inventors: Qingrong Zhao, Madison Heights, MI (US); Qi Zhang, Sterling Heights, MI (US); Bakhtiar B. Litkouhi, Washington, MI (US); Jinsong Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/245,522

(22) Filed: Aug. 24, 2016

(65) Prior Publication Data

US 2018/0059677 A1    Mar. 1, 2018

(51) Int. Cl.
*G05D 1/02* (2006.01)
*G01B 11/06* (2006.01)
*G06K 9/00* (2006.01)
*G06K 9/78* (2006.01)

(52) U.S. Cl.
CPC ........ *G05D 1/0246* (2013.01); *G01B 11/0616* (2013.01); *G06K 9/00791* (2013.01); *G06K 9/78* (2013.01)

(58) Field of Classification Search
CPC ................................... G05D 1/0246
See application file for complete search history.

(56) References Cited

U.S. PATENT DOCUMENTS

| | | | | |
|---|---|---|---|---|
| 5,092,169 A | * | 3/1992 | Bilanin | G01W 1/14 73/178 R |
| 5,705,746 A | * | 1/1998 | Trost | B60T 8/172 180/170 |
| 6,856,882 B2 | * | 2/2005 | Raab | B60T 8/172 440/1 |
| 7,248,958 B2 | * | 7/2007 | Watanabe | B60T 8/1725 701/1 |

(Continued)

*Primary Examiner* — Adam D Tissot
*Assistant Examiner* — Michael A Berns
(74) *Attorney, Agent, or Firm* — Quinn IP Law

(57) ABSTRACT

A method for determining a thickness of water on a path of travel. A plurality of images of a surface of the path of travel is captured by an image capture device over a predetermined sampling period. A plurality of wet surface detection techniques are applied to each of the images. A detection rate is determined in real-time for each wet surface detection technique. A detection rate trigger condition is determined as a function of a velocity of the vehicle for each detection rate. The real-time determined detection rate trigger conditions are compared to predetermined detection rate trigger conditions in a classification module to identify matching results pattern. A water film thickness associated with the matching results pattern is identified in the classification module. A water film thickness signal is provided to a control device. The control device applies the water film thickness signal to mitigate the wet surface condition.

25 Claims, 10 Drawing Sheets

(56) References Cited

U.S. PATENT DOCUMENTS

| | | | | |
|---|---|---|---|---|
| 8,332,134 B2* | 12/2012 | Zhang | ................ | G06K 9/00805 |
| | | | | 340/435 |
| 9,139,056 B2* | 9/2015 | Breuer | .................... | B60C 23/02 |
| 9,499,172 B2* | 11/2016 | Urmson | ................ | B60W 40/06 |
| 9,598,087 B2* | 3/2017 | Zhao | ..................... | B60W 40/06 |
| 9,643,617 B2* | 5/2017 | Fischer | .............. | B60W 40/068 |
| 9,676,331 B2* | 6/2017 | Hartmann | ................ | B60R 1/00 |
| 2016/0379065 A1* | 12/2016 | Hartmann | .......... | G06K 9/00798 |
| | | | | 348/148 |
| 2017/0161570 A1* | 6/2017 | Zhao | ..................... | B60W 40/06 |
| 2017/0161572 A1* | 6/2017 | Zhao | ..................... | B60W 40/06 |
| 2017/0161573 A1* | 6/2017 | Zhao | ..................... | B60W 40/06 |
| 2017/0162045 A1* | 6/2017 | Zhao | ................. | B60R 16/0237 |
| 2018/0059677 A1* | 3/2018 | Zhao | ................. | G01B 11/0616 |
| 2018/0060674 A1* | 3/2018 | Zhao | ..................... | B60W 40/06 |

* cited by examiner

|    | $F_{Vx}(P_i)$ | $D_i$ |
|----|---|---|
| T1 | $P1 >= th_1(Vx)$ | L1 or L2 |
|    | $P1 <= th_1(Vx)$ | L3 or L4 |
| T2 | $P2 >= th_2(Vx)$ | L2 or L3 |
|    | $P2 <= th_2(Vx)$ | L1 or L4 |
| T3 | $P3 >= th_3(Vx)$ | L3 or L4 |
|    | $P3 <= th_3(Vx)$ | L1 or L2 |
| T4 | $P4 >= th_4(Vx)$ | L3 or L4 |
|    | $P4 <= th_4(Vx)$ | L1 or L2 |

Fig. 11

| | |
|---|---|
| T1: $P1 >= th_1(Vx)$<br>T2: $P2 <= th_2(Vx)$<br>T3: $P3 \approx 0$<br>T4: $P4 \approx 0$ | L1 |
| T1: $P1 >= th_1(Vx)$<br>T2: $P2 => th_2(Vx)$<br>T3: $P3 \approx 0$<br>T4: $P4 \approx 0$ | L2 |
| T1: $P1 <= th_1(Vx)$<br>T2: $P2 >= th_2(Vx)$<br>T3: $P3 >= th_3(Vx)$<br>T4: $P4 >= th_4(Vx)$ | L3 |
| T1: $P1 \approx 0$<br>T2: $P2 <= th_2(Vx)$<br>T3: $P3 \approx 1$<br>T4: $P4 \approx 1$ | L4 |

Fig. 12

VISION-BASED ON-BOARD REAL-TIME ESTIMATION OF WATER FILM THICKNESS

BACKGROUND OF INVENTION

An embodiment relates generally to detection of water and water film thickness on a path of travel.

Precipitation on a driving surface causes several different issues for a vehicle. For example, water on a road reduces the coefficient of friction between the tires of the vehicle and the surface of the road resulting in vehicle stability issues. Detection of precipitation on a road of travel is typically determined by a host vehicle sensing for precipitation on the road utilizing some sensing operation which occurs when the precipitation is already impacting the vehicle operation such as detecting wheel slip. As a result, the vehicle must monitor its own operating conditions (e.g., wheel slip) against dry pavement operating conditions for determining whether precipitation is present. As a result, such systems may wait for such a condition to occur or may introduce excitations to the vehicle for determining whether the condition is present (e.g., generating sudden acceleration to the driven wheels for invoking wheel slip if the precipitation is present).

SUMMARY OF INVENTION

An advantage of an embodiment is the detection of water film thickness that exists on the surface of the path of travel. The technique described herein cooperatively utilizes a plurality of vision-based wet surface detection methods to identify road wetness and a thickness level of water film on the surface on the path of travel. The thickness level of water film is pre-categorized into several classes based on the amount of water standing. For each of the respective methods, a correlation graph between detection performance of the method, quantified by detection rate, and water film thickness is established at different speed levels via vehicle testing. Based on the correlation graphs, given vehicle velocity, each respective water film thickness level could be uniquely patterned by a type of combination of detection rate trigger conditions associated with the above methods, which serve as a classification database. When the surface of the path of travel is analyzed in real time by the vehicle driving over the path of travel at a respective velocity, detection rate for each wet surface detection method is estimated based on a sample number of images over a time window period. The group of estimated detection rates along with real time vehicle velocity information are sent to a classifier to compare with each of the pre-stored combinations of detection rate trigger conditions in the classification database to identify a pattern match. Based on the matching, the water film thickness associated with the matched combination of detection rate trigger conditions in the classification database is identified as the water film thickness on the surface of the path of travel. Alerts are provided to the driver as well as water film thickness signals are provided to vehicle control devices for mitigating the effects of the water on the surface of the path of travel for maintaining vehicle stability on the detected wet surface.

An embodiment contemplates a method of determining a thickness of water on a path of travel. A plurality of images of a surface of the path of travel is captured by an image capture device over a predetermined sampling period. The image capture device is focused at the surface where water splash is expected as a vehicle travels along the path of travel. A plurality of wet surface detection techniques is applied by a processor to each of the images. A detection rate is determined in real-time by the processor for each wet surface detection technique. A detection rate trigger condition is determined, by the processor, as a function of a velocity of the vehicle for each detection rate. The real-time determined detection rate trigger conditions is compared to predetermined detection rate trigger conditions in a classification module to identify matching results pattern. The predetermined detection rate trigger conditions represent various water film thickness levels. A water film thickness associated with the matching results pattern in the classification module is identified. A water film thickness signal is provided to a control device. The control device applies the water film thickness signal to mitigate the wet surface condition.

BRIEF DESCRIPTION OF DRAWINGS

FIG. 11 illustrates a table showing detection rates discretely determined for each respective technique.

FIG. 12 illustrates an exemplary lookup table including cooperatively classification of detection results of each technique for each respective layer.

DETAILED DESCRIPTION

Figure 1:
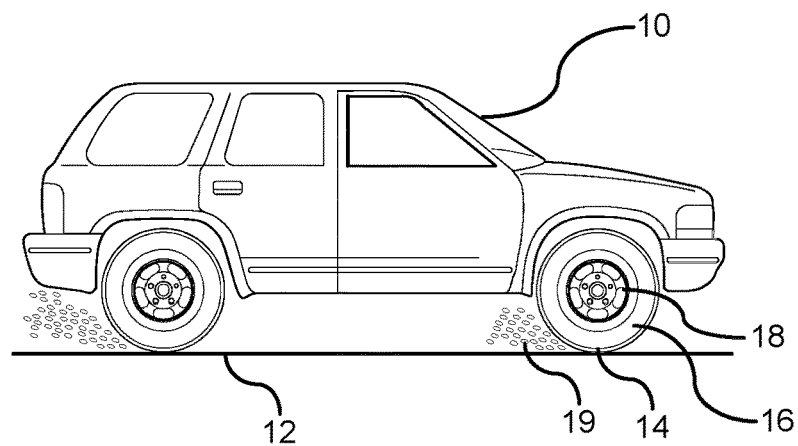
FIG. 1 an exemplary perspective view of a vehicle scene on a wet surface captured by a camera.

There is shown in FIG. 1, a vehicle 10 traveling along a vehicle road 12. Precipitation 19, in the form of water, is shown disposed on the vehicle road 12. The precipitation 19 is often displaced by the vehicle wheel 14 and tires 16 mounted on a rim 18 of the wheel 14 as the tires rotate over the wet surface on the vehicle road 12 or other path of travel. It is not only advantageous to know when the vehicle will be traveling along a wet vehicle road 12 so that issues resulting from water, such as loss of traction or engine degradation resulting from water entering exterior air intake vents can be identified and negated, it is also advantageous to identify the amount of water on the residing on the surface of the road, since the thickness level of water on the road could influence the real tire/road friction. Identifying the thickness of water on the vehicle road 12 can further assist the vehicle in determining an appropriate countermeasure for negating loss of traction and other negative effects that water can have on the vehicle. It should be understood that although an automobile is used herein for exemplary purposes, the embodiments described herein can be applied to other types of systems aside from automobiles where detection of a wet surface condition is desired. Examples of vehicles that are other than automobiles that can utilize this system include, but are not limited to, rail systems, planes, off-road sport vehicles, robotic vehicles, motorcycles, bicycles, farm equipment, and construction equipment.

Precipitation 19 on the vehicle road 12 can result in a reduction of traction when driving on the wet surface. The precipitation 19 disposed on the vehicle road 12 lowers the coefficient of friction between the vehicle tires and the vehicle road 12. As a result, traction between the vehicle tires and the vehicle road 12 is lowered. Identifying the amount of water on the road can further assist the vehicle in determining the appropriate mitigation technique for minimizing any loss of traction by various mitigation techniques that include, but are not limited to, warning the driver to lower the vehicle speed to one that is conducive to the environmental conditions; actuating automatic application of the vehicle brake using a very low braking force to minimize the precipitation formed on the braking surfaces of the braking components; deactivation or restricting the activation of some advanced driver assistance features such as cruise control while precipitation is detected; or notification to the driver to maintain a greater stopping distance to a lead vehicle.

Figure 3:
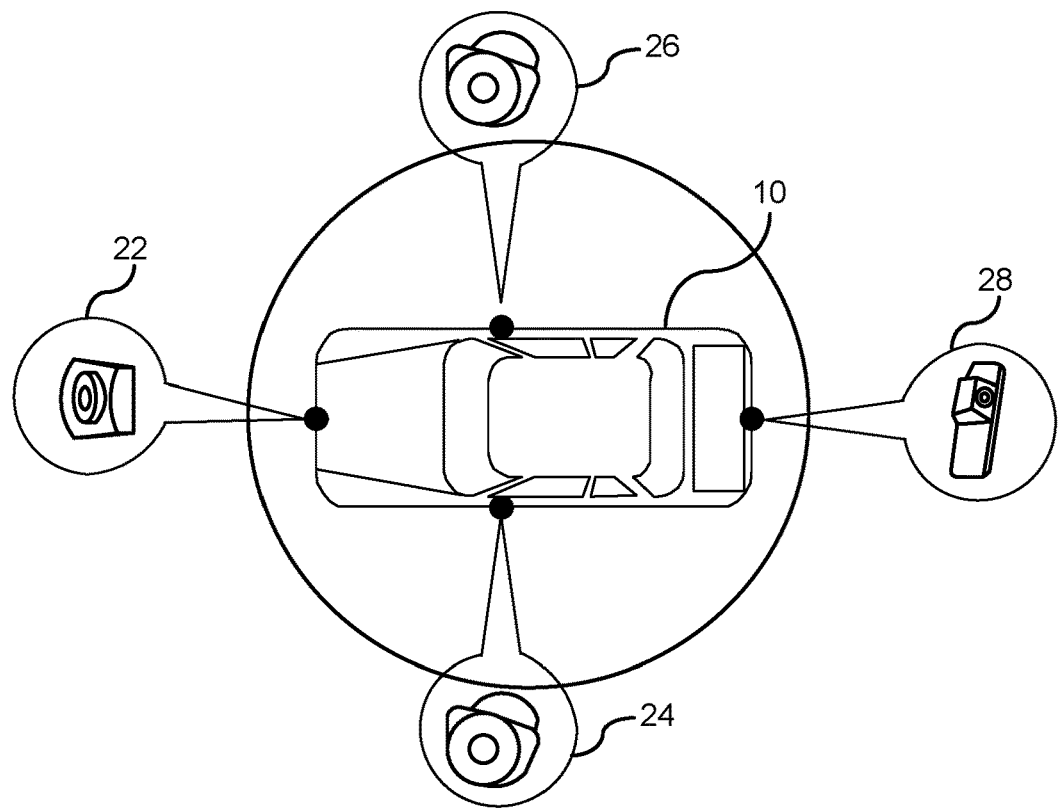
FIG. 3 is an exemplary perspective view of a vehicle surround having surround view coverage.
Figure 2:
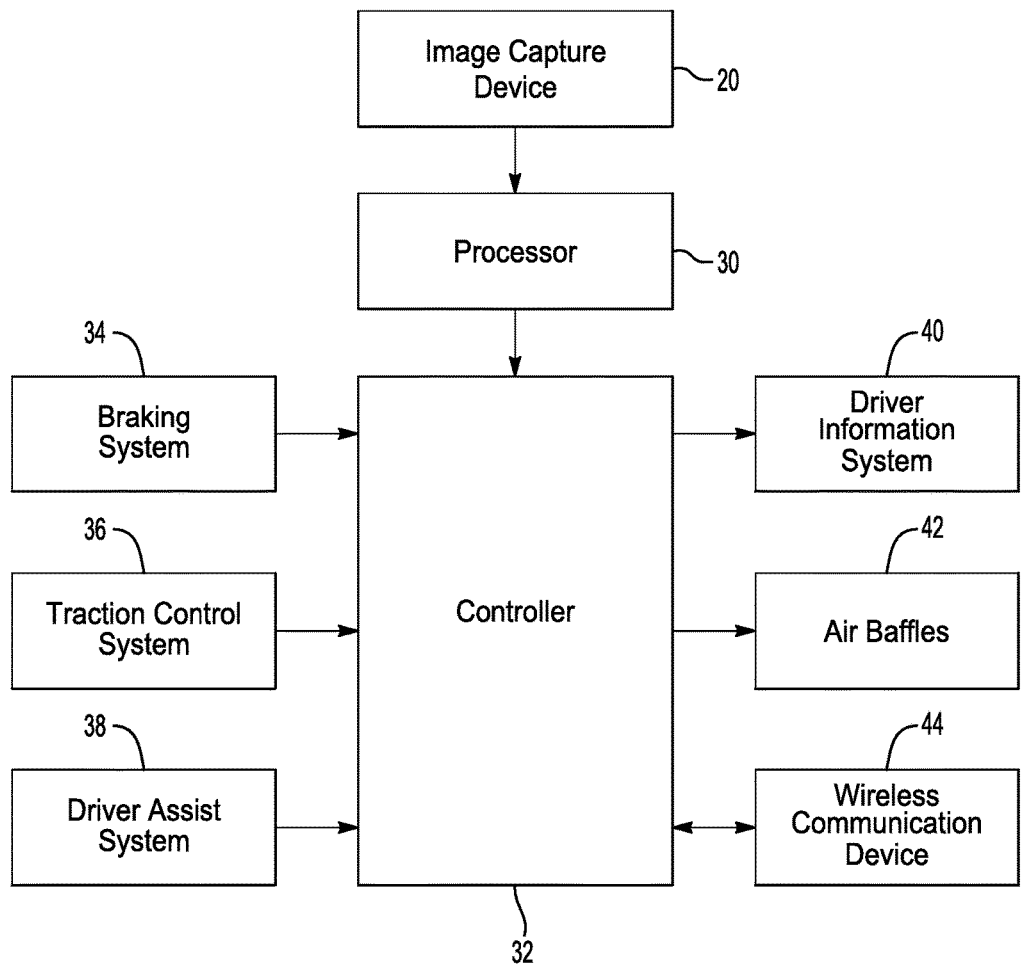
FIG. 2 illustrates a block diagram of a wet surface detection system.

FIG. 2 illustrates a block diagram of a wet surface detection system. A plurality of vehicle-based image capture devices 20 are mounted on the vehicle for capturing images around the vehicle. The plurality of vehicle based image capture devices 20 may be mounted on the front, rear, and sides of the vehicle. FIG. 3 illustrates an exemplary 360 degree surround view coverage for detecting objects around the vehicle. Each of the image-based capture devices are cooperatively used to detect and identify objects on each side of the vehicle. The image-based capture devices 20 include, but are not limited to, a front view camera 22 mounted to the front of the vehicle capturing image forward and partially to the sides of the vehicle, a driver's side camera 24 capturing images on the driver side of the vehicle, a passenger's side camera 26 capturing images on the passenger side of the vehicle, and a rearward facing camera 28 capturing images rearward and to the side of the vehicle.

Referring again to FIG. 2, a processor 30 processes the images captured by the image capture devices 20. The processor 30 analyzes images and data to determine whether water is present on the surface of the path of travel based on various water detection techniques. Such techniques may include a mirrored light image analysis technique, a tire rearward splash analysis technique, a tire side splash analysis technique, and a tire track analysis technique. Each of the respective techniques are described in co-pending application (Ser. No. 14/568,656) dated Dec. 12, 2014 entitled "Systems And Method For Determining A Condition Of A Road Surface"; co-pending application (Ser. No. 14/957,953) dated Dec. 3, 2015 entitled "Vision-Based Wet Road Surface Condition Detection Using Tire Rearward Splash"; co-pending application (Ser. No. 14/957,998) dated Dec. 3, 2015 entitled "Vision-Based Wet Road Surface Condition Detection Using Tire Side Splash"; and co-pending application (Ser. No. 14/957,983) dated Dec. 3, 2015 entitled "Vision-Based Wet Road Surface Condition Detection Using Tire Tracks", which are each incorporated by reference in their entirety.

The processor 30 may be part of an existing system, such as traction control system 36 or other system, or can be a standalone processor dedicated to analyzing data from the image capture devices 20.

The processor 30 may be coupled to one or more output devices such as a controller 32 for initiating or actuating a control action, e.g., of a vehicle subsystem, based on the analysis applied by the processor. One or more countermeasures may be actuated for mitigating the effect that the water may have on the operation of the vehicle based on the amount of water estimated on the surface of the road.

The controller 32 may be part of the vehicle subsystem or may be used to enable a vehicle subsystem for countering the effects of the water. For example, in response to a determination that the road is wet, the controller 32 may enable an electrical or electro-hydraulic braking system 34 or similar where a braking strategy is readied in the event that traction loss occurs. In addition to preparing a braking strategy, the braking system may autonomously apply a light braking force, without awareness to the driver, to remove water from the vehicle brakes once the vehicle enters the water. Removal of water build-up from the wheels and brakes maintains an expected coefficient of friction between the vehicle brake actuators and the braking surface of the wheels when braking by the driver is manually applied.

The controller 32 may control a traction control system 36 which distributes power individually to each respective wheel for reducing wheel slip by a respective wheel when a respective amount of water is detected on the surface of the path of travel such as in the case of hydroplaning.

The controller 32 may control an advanced driver assistance system 38 (for example, cruise control system, adaptive cruise control system, lane following system, lane change system, evasive/assist steering maneuver system, automated emergency braking system, etc.) which can deactivate the system functionality or restrict the activation of the system when water is detected on the surface of the path of travel.

The controller 32 itself may be an advanced driver assistance system 38 which is designed to automatically adjust its system functionality to accommodate the surface wetness by integrating a wet surface signal into its controller design process and perform safely when water is detected on the surface of the path of travel.

The controller 32 may control a driver information system 40 for providing warnings to the driver of the vehicle concerning water that is detected on the vehicle road. Such a warning actuated by the controller 32 may alert the driver to the approaching water on the surface of the path of travel and may recommend that the driver lower the vehicle speed to a speed that is conducive to the current environmental conditions, or the controller 32 may actuate a warning to maintain a safe driving distance to the vehicle forward of the driven vehicle. It should be understood that the controller 32, as described herein, may include one or more controllers that control an individual function or may control a combination of functions.

The controller 32 may further control the actuation of automatically opening and closing air baffles 42 for preventing water ingestion into an engine of the vehicle. Under such conditions, the controller 32 automatically actuates the closing of the air baffles 42 when water is detected to be present on the surface of the path of travel in front of the vehicle and may re-open the air baffles when water is determined to no longer be present on the surface.

The controller 32 may further control the actuation of a wireless communication device 44 for autonomously communicating the wet pavement condition to other vehicles utilizing a vehicle-to-vehicle or vehicle-to-infrastructure communication system.

The controller may further provide the wet surface signal alerts to a driver of the vehicle against a use of advanced driver assistance systems.

Figure 4:
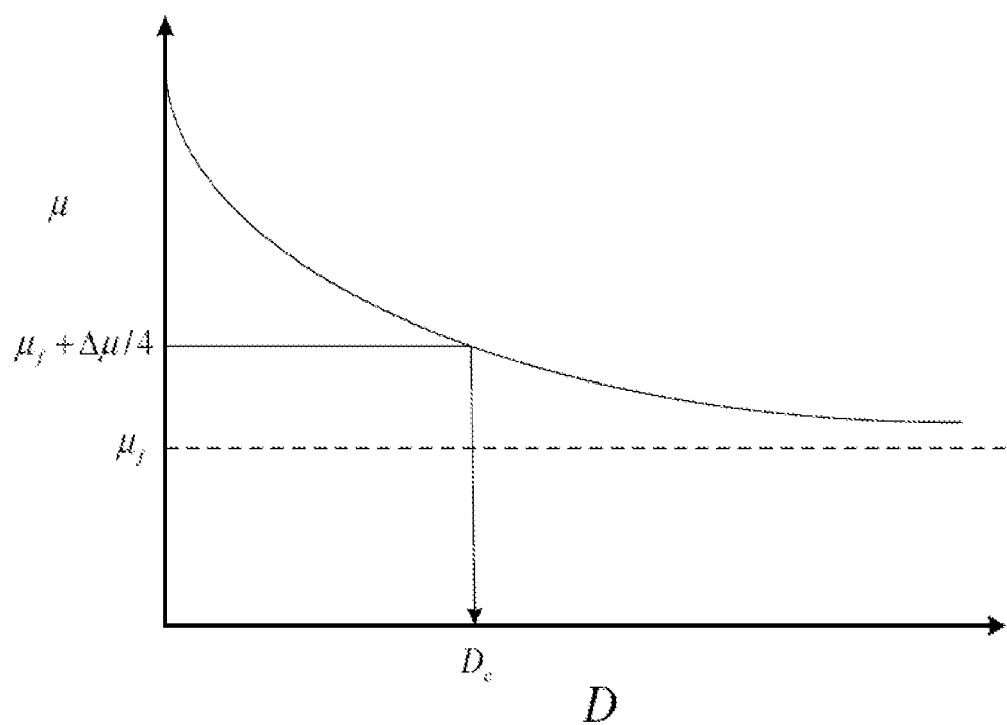
FIG. 4 illustrates an exemplary graph illustrating a correlation between friction coefficient on a path of travel and water film thickness.

FIG. 4 illustrates an exemplary graph illustrating a correlation between coefficient of friction ($\mu$) on a surface of the path of travel and water film thickness (D). As shown in the graph, loss of friction of the surface becomes critical when a respective coefficient of friction becomes less than a respective critical coefficient of friction value ($\mu_f + \Delta\mu/4$). This can be associated to a period when the water film thickness on the surface of the road becomes greater than a respective thickness ($D_c$). As a result, having knowledge of the current water film thickness on the surface can assist in warning the driver of a potential hydroplaning condition and/or controlling and implementing advanced driver assistance systems (ADAS).

Figure 5:
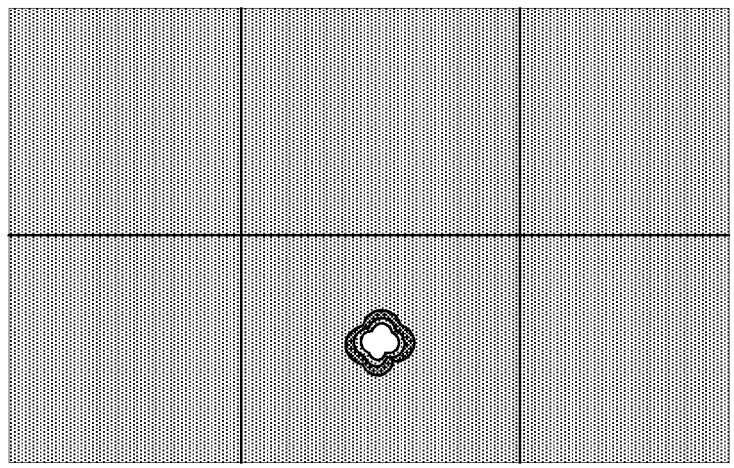
FIG. 5 illustrates an exemplary image captured of a mirrored surface.
Figure 6:
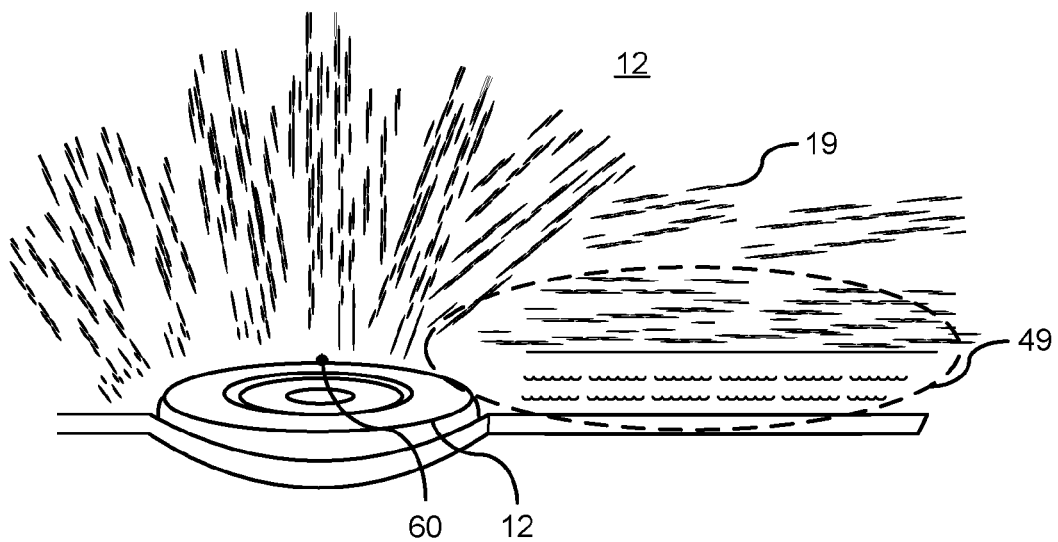
FIG. 6 illustrates an exemplary an image captured of rearward splash occurs.
Figure 7:
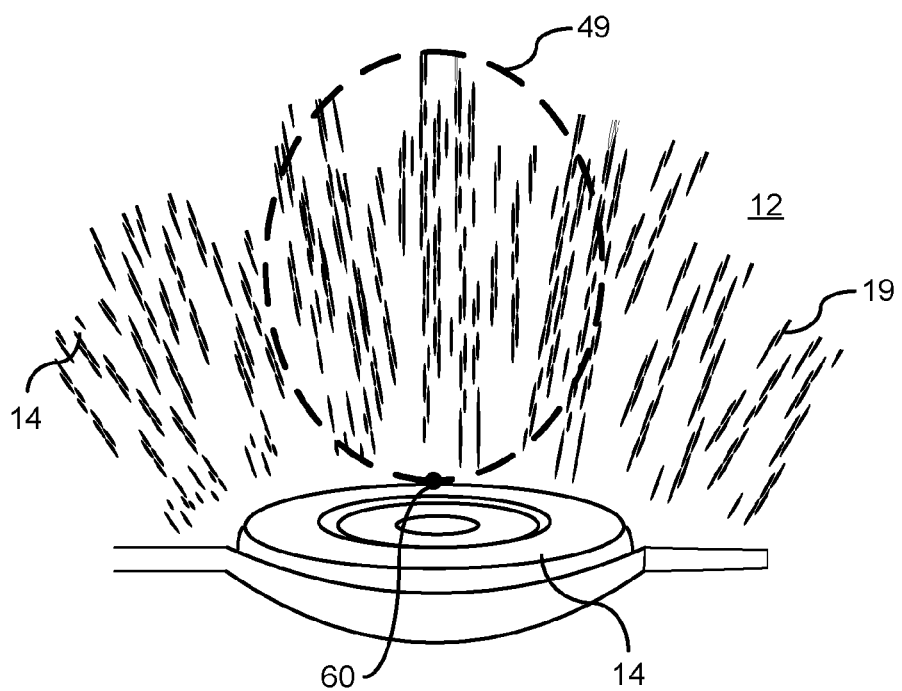
FIG. 7 illustrates an exemplary image captured of side tire splash.
Figure 8:
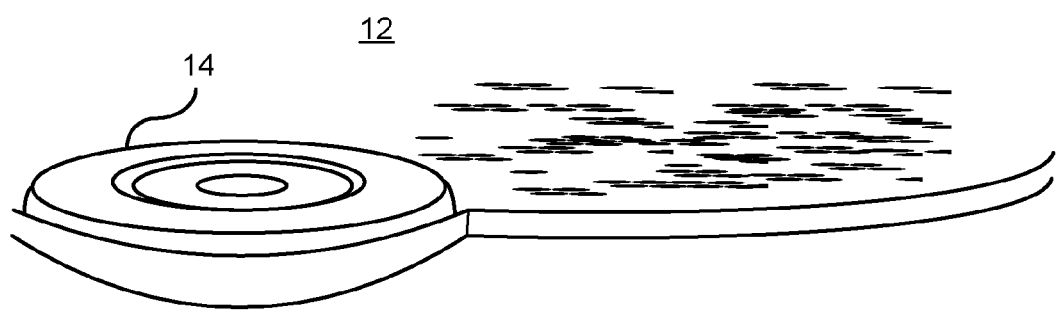
FIG. 8 illustrates an image when tire tracks are generated on a wet surface.

The various techniques described above each provide a novel approach as to determining wet surface. Each of the following figures represents exemplary images where the respective techniques are capable of detecting water on the surface based on the disbursement of water or reflection of light in the image. For example, FIG. 5 illustrates an image captured of a mirrored surface where ice or a wet road is detected by the mirrored light image analysis technique. FIG. 6 illustrates an image captured when a rearward splash occurs that is detected by the rearward splash analysis technique. FIG. 7 illustrates an image captured when a side tire splash occurs that is detected by the side splash analysis technique. FIG. 8 illustrates an image when tire tracks are generated on a wet surface that is detected by the tire track analysis technique. Each of the techniques describe earlier is proficient at identifying water on the road when water displacement or non-displacement is present; however, water thickness on the surface may be an additional factor as to whether the respective techniques can proficiently detect the water. The following technique describes a process of using each of the wet surface techniques cooperatively to identify the amount of water on the surface. To utilize this process in the vehicle in real time, offline training is performed first to build a classifier, correlation graph, or similar with distinguished features that can well represent water film thickness level for real time classification analysis in the vehicle.

Figure 9:
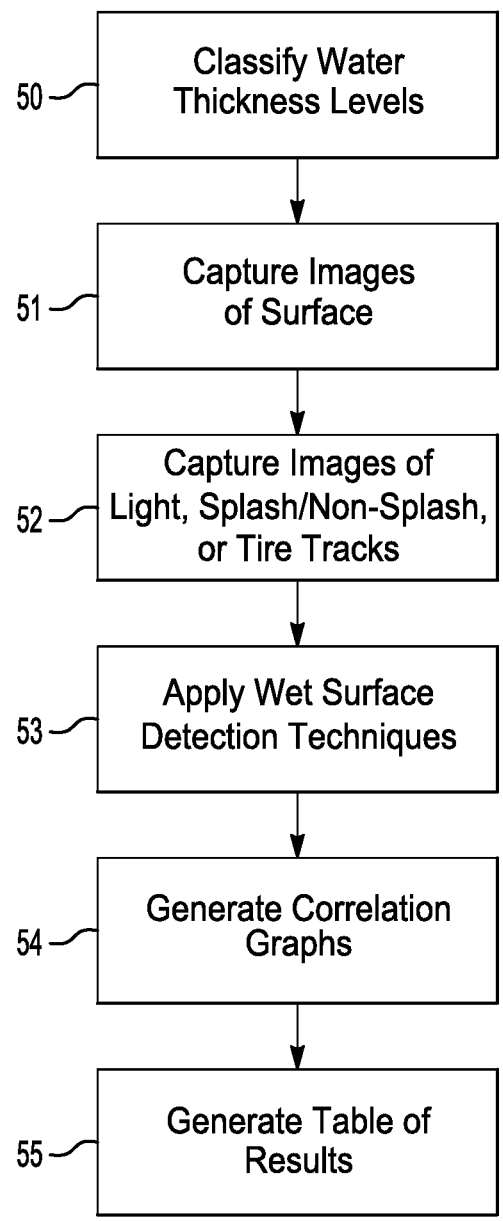
FIG. 9 illustrates process for building an exemplary lookup table based classifier offline.

FIG. 9 illustrates the process for building the classifier offline. In step 50, test conditions are set up where predetermined depths of water are disposed on a surface of the road. Various water thickness levels are defined. For example, various water thickness levels may be classified using the following labels: water thickness<0.5 mm is categorized as a first layer level (L1); 0.5 mm<water thickness<1.0 mm is categorized as a second layer level (L2); 1.0 mm<water thickness<2.5 mm is categorized as a third layer level (L3); and water thickness>2.5 mm is categorized as a fourth layer level (L4). It should be understood more or less respective ranges can be utilized without deviating from the scope of the invention.

In step 51, test vehicles are driven over the water covered path of travel at different velocities and at the various water film thickness, and the surface is captured by image capture devices as the vehicle travels over wet surface.

In step 52, images of light, splash, non-splash, or tire tracks are captured by the image capture device as the tires travel over the wet surface.

In step 53, the image data is collected and each wet surface detection technique is applied to the image data by the processor for determining the presence of water on the surface. A detection rate for each respective analyzed image is determined by the processor based on successful identification or non-identification of water on the surface while the vehicle is traveling at that respective velocity.

Figure 10:
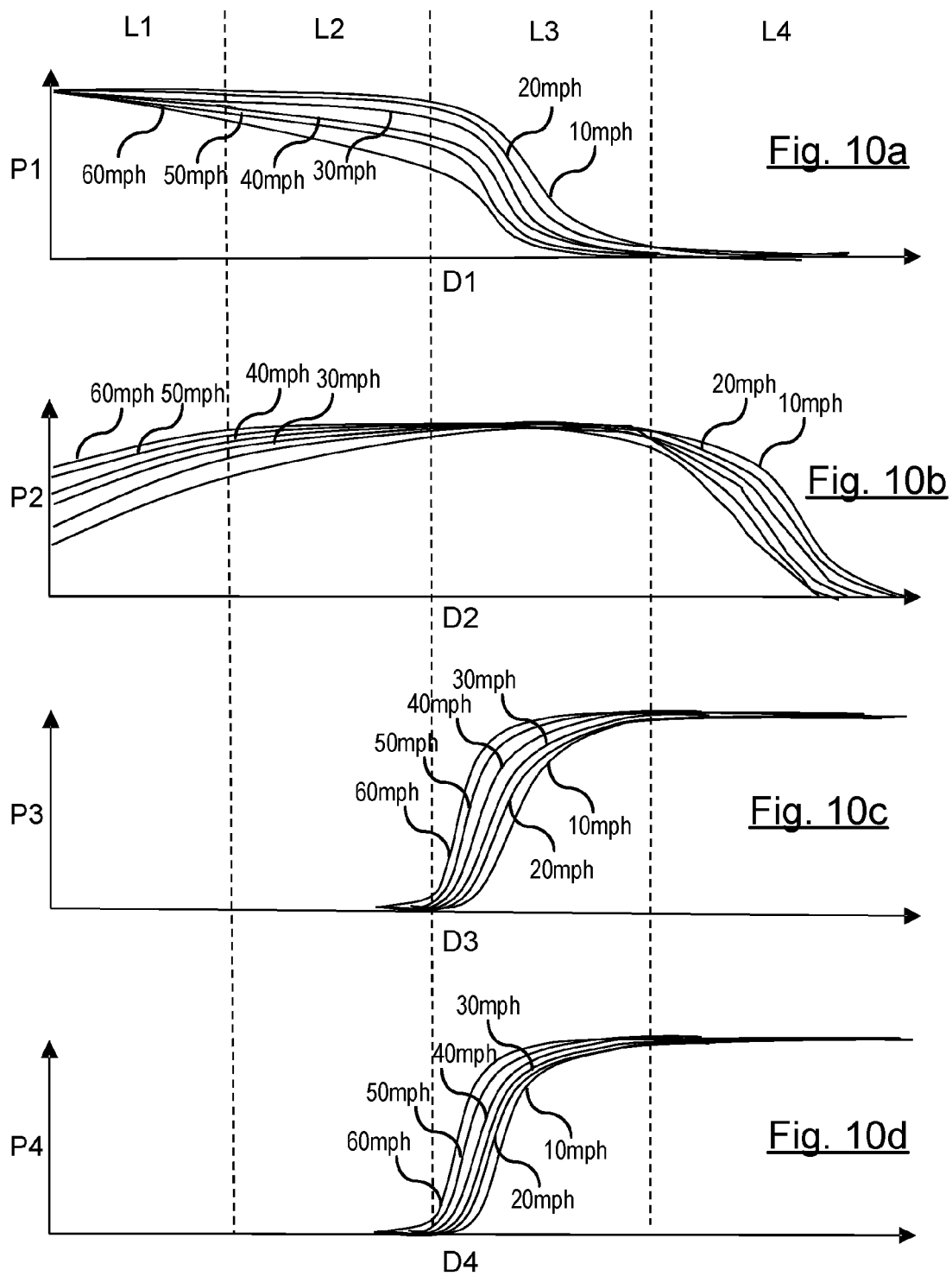
FIG. 10a illustrates the resulting correlation graph for the first technique $T_1$.
FIG. 10b illustrates the resulting lookup table for the second technique $T_2$.
FIG. 10c illustrates the resulting correlation graph for third technique $T_3$.
FIG. 10d illustrates the resulting correlation graph for the fourth technique $T_4$.

In step 54, correlation graphs are generated for each of the respective techniques based on the detection rate (F) versus the water thickness ($D_t$) at each respective velocity (e.g. 10 mph, 20 mph, 30 mph, 40 mph, 50 mph, 60 mph). FIGS. 10a-d illustrate the correlation graphs for each technique which includes correlation curves as a function of water thickness ($D_t$) vs the detection rate (P) for each respective velocity. FIG. 10a illustrates the resulting correlation graph for the first technique $T_1$ (e.g., mirrored light image analysis). FIG. 10b illustrates the resulting correlation graph for the second technique $T_2$ (e.g., tire rearward splash analysis). FIG. 10c illustrates the resulting correlation graph for third technique $T_3$ (e.g., the tire side splash analysis). FIG. 10d illustrates the resulting correlation graph for the fourth technique $T_4$ (e.g., tire track analysis). The plots in each of the graphs are divided and classified into the first layer section L1, the second layer section L2, the third layer section L3, and the fourth layer section L4. The layer sections each represent the water film thickness range as described earlier.

Referring again to FIG. 9, in step 55, a table is generated illustrating binary detection rate results. FIG. 11 illustrates a table where detection rates are discretely determined for each respective technique. Since the water film thickness is known for each image taken based on the test set up, the detection rate may be properly assigned to the respective layer representing the respective water film thickness. It should be understood that the respective film thicknesses are not zero, as a thickness of zero would represent a non-wet surface. As shown in the table, determined detection rates for each respective layer of each respective technique are compared to a velocity-based threshold to indicate a degree of certainty of whether water is present on the surface. The comparison may be normalized for indicating the degree of certainty associated with each respective detection rate. For example, vary categories may be used to identify the normalized detection rate trigger condition generated from the comparison. The normalized detection rate trigger conditions may include one of the following: a positive determination of water present on the surface; a positive indication of water present on the surface; an uncertainty of whether water is present on the surface; and no detection of water on the surface. The positive determination of water present on the surface is representative of the detection rate substantially equal to a value of 1 indicating all sample images identified water in the image using the respective technique when water was in fact present. The positive indication of water present on the surface is representative of the detection rate being greater than the velocity-based threshold but less than 1. The uncertainty of water present on the surface is representative of the detection rate being less than the velocity-based threshold but greater than 0. The no detection of water on the surface is represented by the detection rate substantially equal to 0. It should be understood that the number of categories of detection rate trigger conditions as shown used herein is exemplary and that more or less categories of detection rate trigger conditions may be used.

The results shown in FIG. 11 are binary conditions such that only one technique is used independently to identify the depth of water on the surface. As shown in the exemplary table in FIG. 9, for the first technique $T_1$, this technique is proficient at detecting water on the surface when the water level is in the first layer or the second layer, and is inefficient at detecting water on the surface when the water level is in the third layer or the fourth layer. This table is generated for each respective technique. The drawback of utilizing this table is that results are only binary such that a detection can only be based on a single technique. To increase the robustness for identifying which water level is present in the image, the results from each of the techniques are cooperatively used in a decision making process for determining a respective water level condition based on the combined detection rate trigger conditions.

FIG. 12 illustrates an exemplary lookup table applied as a classification module where the detection rate trigger conditions of each technique for each respective layer are cooperatively classified. As shown in the lookup table, each of the detection results generated for the first water film thickness of each detection technique are grouped under the first layer L1. For the second layer L2, each of the detection results generated for the second water film thickness of each detection technique are grouped. For the third layer L3, each of the detection results generated for the third water film thickness of each detection technique are grouped. For the fourth layer L4, each of the detection results generated for the fourth detection technique of each detection technique are grouped. It should be understood that various approaches may be utilized other than the lookup table to generate the classification module that include, but is not limited to, Dempster-Shafer Evidence theory, a Bayesian Network Theory, or a voting logic theory.

The following is an example shown in the lookup table. For a vehicle driven on a surface having water level depth of the first layer L1, the lookup table indicates that the first technique $T_1$ is very good at identifying the presence of water at this respective water level as the detection rate P1 is greater that the velocity-based threshold $th_1(V_x)$. The second technique $T_2$ indicates presence of water, but the data deteriorates and is inconsistent at this respective water film thickness which is determined by the detection rate P2 being less that $th_2(V_x)$. The third technique $T_3$ and the fourth technique $T_4$ are deficient at detecting water when this water film thickness is actually present on the surface (P3 and P4≈0).

In the second grouping in the lookup table, each of the detection results generated for the second water film thickness of each detection technique are grouped under the second layer L2. For a vehicle driven on a surface of a path of travel having water level depth of the second layer L2, the lookup table indicates that the first technique $T_1$ is very good at identifying the presence of water at this respective water level as the detection rate P1>velocity-based threshold $th_1(V_x)$. It is also shown that the second technique $T_2$ is very good at identifying the presence of water at this respective water level as the detection rate D2>velocity-based threshold $th_2(V_x)$. The third technique $T_3$ and the fourth technique $T_4$ are deficient at detecting water when this water film thickness is present on the surface (D3 and D4≈0).

In the third grouping in the lookup table, each of the detection results generated for the third water film thickness of each detection technique are grouped under the third layer L3. For a vehicle driven on a surface of a path of travel having water level depth of the third layer L3, the lookup table indicates that the first technique $T_1$ is deficient at detecting water as the data deteriorates and is inconsistent at this respective water film thickness which is determined by the detection rate D1 being less that $th_1(V_x)$. The second technique $T_2$, third technique $T_3$, and fourth technique $T_4$ are very good at identifying the presence of water at this respective water level as the each of their respective detection rates are greater than their respective velocity-based thresholds.

In the fourth grouping in the lookup table, each of the detection results generated for the fourth water film thickness of each detection technique are grouped under the fourth layer L4. For a vehicle driven on a surface of a path of travel having water level depth of the fourth layer L4, the lookup table indicates that the first technique $T_1$ is very good at identifying the presence of water. In another example of the lookup table, for a vehicle driven on a surface having water level in the range of the deep layer section L4, the lookup table indicates that the first technique $T_1$ does not detect water when this respective water level is actually present. The second technique $T_2$ indicates presence of water, but the data deteriorates and is inconsistent when this level of water is present. The third technique $T_3$ and the fourth technique $T_4$ are proficient at identifying the presence of water when this level of water is present.

Once the lookup table is generated for each technique, the lookup table is implemented online serving as the classification database in vehicle or similar for real time detection and analysis for water.

Figure 13:
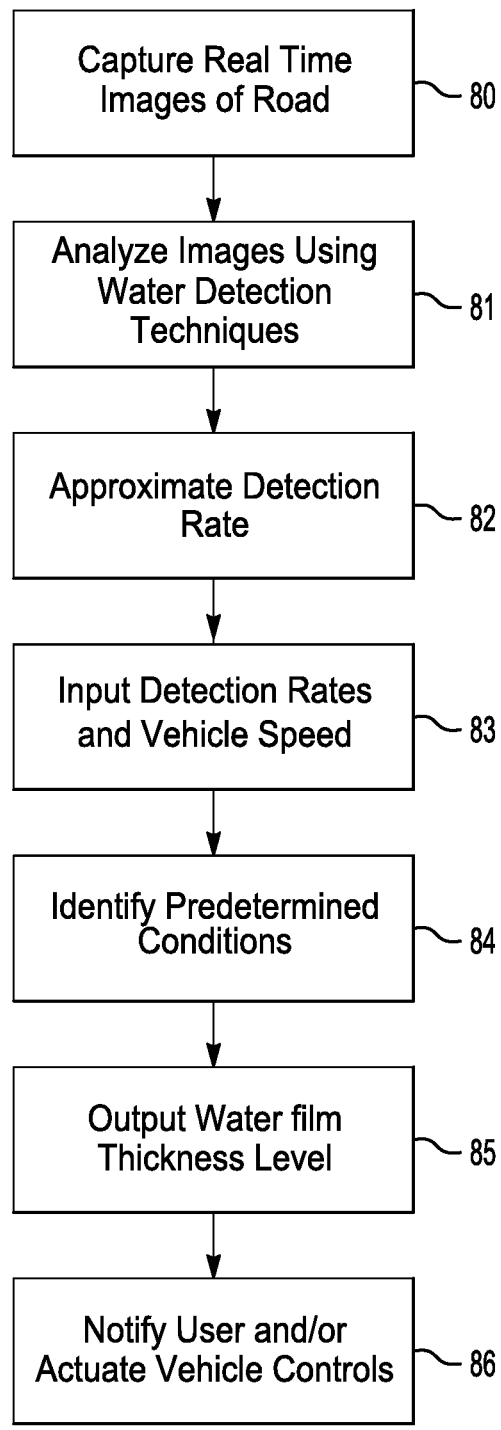
FIG. 13 illustrates a flowchart for a method of utilizing the lookup table in real time in a vehicle.

FIG. 13 describes a process for utilizing the lookup table in real time in a vehicle. In step 80, images are captured of the vehicle road by the image capture device in real time utilizing the image capture device and the data is provided to the processor for analysis. One or more of the image capture devices capture images over a respective period of time (e.g., 30 frames sampled over 1 sec).

In step 81, for each of the images captured during this respective time frame, each image is analyzed by the processor using each respective water detection technique and a detection rate is determined for each technique. Since only a low amount of samples can be obtained and analyzed in a short period of time only an estimation can be generated. In step 82, the detection rate for each technique is approximated. The detection rate $P_{Ti}$ for each technique can be calculated as follows:

$$P_{Ti} \approx \frac{\text{sample numbers of wet road decision}}{N}$$

where the sample number of wet road decision represents the number of samples that positively identified water on the surface by that respective technique, N represents the total number of images sampled for that respective technique, and $T_i$ represents the respective technique used to identify the surface condition. Based on the estimated detection rate for each technique, a determination can be made as to which water level the respective technique is best suited for.

In step 83, the detection rates as determined for each technique used to identify the water on the surface are input to the processor for determining the depth of water on the current surface. In addition, the current vehicle speed is input to the processor.

In step 84, the processor identifies each group of predetermined conditions from each water film thickness associated with the input velocity (in step 83) and compares the detections rates as determined online in step 82 with the groups of predetermined conditions identified in step 83. That is, each of the respective input detection rates for each respective technique when compared to the velocity-based threshold will generate detection rate trigger condition such as exceeding the velocity-based threshold, not exceeding the velocity-based threshold, or being substantially zero. These results will be pattern matched with lookup table for identifying the water film thickness level on the surface. For example, in the table, a first level condition was identified in the offline process as the detection rate for the first technique being greater that the comparative velocity-based threshold, the detection rate for the second technique being less than the comparative velocity-based threshold, and the detection rates for the third technique and fourth technique being substantially zero. If the real time detection rate trigger condition for each of the techniques in real time match the detection rate trigger conditions set forth in the table for the first layer level (L1), then the processor determines that the water level on the current driven surface is in the first layer level (L1) (e.g., D<0.5 mm). That is, pattern matching is performed to match the detection rate trigger conditions determined in real time with the predetermined detection rate trigger conditions from the lookup table to identify a match.

In step 85, the water film thickness level associated with the predetermined detection rate trigger conditions from the lookup table that matched the real time results is output from the processor.

In step 86, the water film thickness level information is provided to a control device where either a warning is output to a driver to notify the user of the wet road condition or is provided to a control device that utilizes the information to actuate vehicle controls to counteract the wet road conditions.

While certain embodiments of the present invention have been described in detail, those familiar with the art to which this invention relates will recognize various alternative designs, filtering process and embodiments for practicing the invention as defined by the following claims.

What is claimed is:

1. A method for determining a thickness of water on a path of travel of a vehicle having a subsystem, the subsystem including air baffles on an air intake scoop of the vehicle, a traction control system, a cruise or adaptive cruise control system, a steering assist system, and/or a brake system, the method comprising:
    capturing a plurality of images of a surface of the path of travel by an image capture device over a predetermined sampling period, the image capture device being focused at the surface where water splash is expected as the vehicle travels along the path of travel;
    applying a plurality of wet surface detection techniques, by a processor of a controller of the vehicle, to each of the images;
    determining in real-time, by the processor, a respective detection rate for each of the wet surface detection techniques;
    determining, by the processor, a respective detection rate trigger condition as a function of a velocity of the vehicle for each of the respective detection rates;
    comparing each of the respective detection rate trigger conditions to predetermined detection rate trigger conditions in a classification module of the controller to identify a matching results pattern, the predetermined detection rate trigger conditions representing various water film thickness levels;
    identifying a water film thickness associated with the matching results pattern in the classification module;
    providing a water film thickness signal to the controller indicative of the identified water film thickness associated with the matching results pattern; and
    in response to receipt of the water film thickness signal, executing a control action of the subsystem aboard the vehicle, via the controller, to thereby mitigate an effect of the wet surface condition on operation of the vehicle;
    wherein executing a control action includes shutting the air baffles, actuating the traction control system, disabling the cruise or adaptive cruise control system, disabling the steering assist system, and/or applying brakes of the brake system.

2. The method of claim 1 wherein the plurality of wet surface detection techniques includes at least a rearward tire splash analysis technique.

3. The method of claim 1 wherein the plurality of wet surface techniques includes at least a side tire splash analysis technique.

4. The method of claim 1 wherein the plurality of wet surface techniques includes at least a tire track analysis technique.

5. The method of claim 1 wherein the plurality of wet surface techniques includes at least a mirrored light image analysis technique.

6. The method of claim 1 wherein the detection rate for each applied wet surface detection technique is determined using the following formula:

$$PTi = \frac{\text{sample numbers of wet road decision}}{N}$$

where the sample numbers of wet road decision represents a number of samples that positively identifies water on the surface by a respective technique during a window period, N represents the total number of images sampled for that respective technique during the window period, and Ti represents the respective technique used to identify the surface condition.

7. The method of claim 1 wherein each detection rate trigger condition is determined as function of comparing each detection rate to a respective predetermined velocity-based threshold value.

8. The method of claim 7 wherein each detection rate trigger condition is normalized.

9. The method of claim 8 wherein each normalized detection rate trigger condition represents a degree of certainty of water present on the surface.

10. The method of claim 7 wherein utilizing the classification module includes utilizing a Dempster-Shafer Evidential theory.

11. The method of claim 7 wherein utilizing the classification module includes utilizing a Bayesian Network theory.

12. The method of claim 7 wherein utilizing the classification module includes utilizing a lookup table.

13. The method of claim 12 wherein the normalized detection rate trigger condition includes one of a positive determination of water present on the surface, a positive indication of water present on the surface, an uncertainty of whether water is present on the surface, and no detection of water on the surface, wherein the positive determination of water present on the surface is representative of the detection rate substantially equal to a value of 1, wherein the positive indication of water present on the road surface is representative of the detection rate being greater than the velocity-based threshold but less than 1, the uncertainty of water present on the surface is representative of the detection rate being less than the velocity-based threshold but greater than 0, and no detection of water on the surface is represented by the detection rate substantially equal to 0.

14. The method of claim 13 wherein the lookup table is generated in an offline process and is stored in a vehicle memory.

15. The method of claim 14 wherein the lookup table includes groups of detection rate trigger conditions, wherein each group includes a respective detection rate trigger condition from each wet surface technique.

16. The method of claim 15 wherein each group in the lookup table is associated with a respective water film thickness range.

17. The method of claim 1 wherein the control action includes using the identified water film thickness to determine and execute an autonomous actuating vehicle braking strategy aboard the vehicle by applying the brakes of the brake system at a braking force sufficient for removing water from the brakes.

18. The method of claim 1 wherein the subsystem is the traction control system of the vehicle, and the control action includes autonomously actuating the traction control system.

19. The method of claim 1 wherein the subsystem is a wireless communication system of the vehicle, the method further comprising providing the identified water film thickness signal to the wireless communication system to thereby alert other vehicles of the identified water film thickness on the surface.

20. The method of claim 1 further comprising using the identified water film thickness signal alerts to alert a driver of the vehicle of a potential reduced traction between vehicle tires and the surface as a result of the identified water film thickness or against a use of a driver assistance system.

21. The method of claim 1 further comprising using the identified water film thickness signal to alert a driver of the vehicle against a use of a driver assistance system.

22. The method of claim 1 wherein the subsystem includes the cruise control system, and the control action includes autonomously disabling the cruise control system in response to the identified water film thickness.

23. The method of claim 1 further comprising using the identified water film thickness signal to alert a driver of the vehicle to reduce a vehicle speed in response to the identified water film thickness.

24. The method of claim 1 wherein the subsystem includes the air baffles, and the control action includes shutting the air baffles on the air intake scoop of the vehicle in response to the identified water film thickness to thereby prevent water ingestion into an engine of the vehicle.

25. A method for determining a thickness of water on a path of travel of a vehicle having air baffles on an air intake scoop to an engine of the vehicle, the method comprising:
    capturing a plurality of images of a surface of the path of travel by an image capture device over a predetermined sampling period, the image capture device being focused at the surface where water splash is expected as the vehicle travels along the path of travel;
    applying a plurality of wet surface detection techniques, by a processor of a controller of the vehicle, to each of the images;
    determining in real-time, by the processor, a respective detection rate for each of the wet surface detection techniques;
    determining, by the processor, a respective detection rate trigger condition as a function of a velocity of the vehicle for each of the respective detection rates;
    comparing each of the respective detection rate trigger conditions to predetermined detection rate trigger conditions in a classification module of the controller to identify a matching results pattern, the predetermined detection rate trigger conditions representing various water film thickness levels;
    identifying a water film thickness associated with the matching results pattern in the classification module;
    providing a water film thickness signal to the controller indicative of the identified water film thickness associated with the matching results pattern; and
    in response to receipt of the water film thickness signal by the controller, autonomously shutting the air baffles.

* * * * *